United States Patent

Meylan

[11] Patent Number: 5,676,511
[45] Date of Patent: Oct. 14, 1997

[54] SCREW SECURING DEVICE

[75] Inventor: Pierre Meylan, Neuenhof, Switzerland

[73] Assignee: Asea Brown Boveri AG, Baden, Switzerland

[21] Appl. No.: 707,602

[22] Filed: Sep. 5, 1996

[30] Foreign Application Priority Data

Oct. 27, 1995 [DE] Germany ............ 195 40 051.8

[51] Int. Cl.$^6$ ............................................. F16B 39/00
[52] U.S. Cl. ........................ 411/372; 411/376; 411/107; 411/108; 411/413
[58] Field of Search ....................... 411/103, 105, 411/120, 131, 134, 108, 107, 204, 371, 1, 373, 376, 413, 130

[56] References Cited

U.S. PATENT DOCUMENTS

| 2,633,176 | 3/1953 | Fears ............ | 411/372 |
| 4,167,886 | 9/1979 | Seghezzi ........ | 411/372 |
| 4,613,265 | 9/1986 | Visinand ........ | 411/372 |
| 4,711,760 | 12/1987 | Blaushild ...... | 411/108 |

FOREIGN PATENT DOCUMENTS

| 2042312 | 12/1971 | Germany . | |
| 2242870 | 3/1974 | Germany . | |
| 608864 | 9/1960 | Italy ............ | 411/373 |

*Primary Examiner*—Flemming Saether
*Attorney, Agent, or Firm*—Burns, Doane, Swecker & Mathis, L.L.P.

[57] ABSTRACT

In a screw securing device for a screw (1) by means of which a first component (2a) and a second component (2b) are clamped together, a bushing (5a, 5b), includes a cylinder (5a) and a base (5b) which contains a bore, the bushing being arranged in a first bore (3a) of the first component (2a). The first bore (3a) opens into a smaller, second bore (3b) of the first component (2a), and said second bore (3b) is provided with a left-handed thread (8) in which there is screwed a tubular extension (5c) which is arranged coaxially with the bore in the base (5b). The screw (1) is screwed, through the bushing (5a, 5b) and the tubular extension (5c), into the second component (2b) by means of its right-handed thread (7). A cap (6a), having an insert (6b) which is connected to the screw head in a positively locking manner, is fastened on the bushing (5a, 5b) by a welding bead (4).

2 Claims, 1 Drawing Sheet

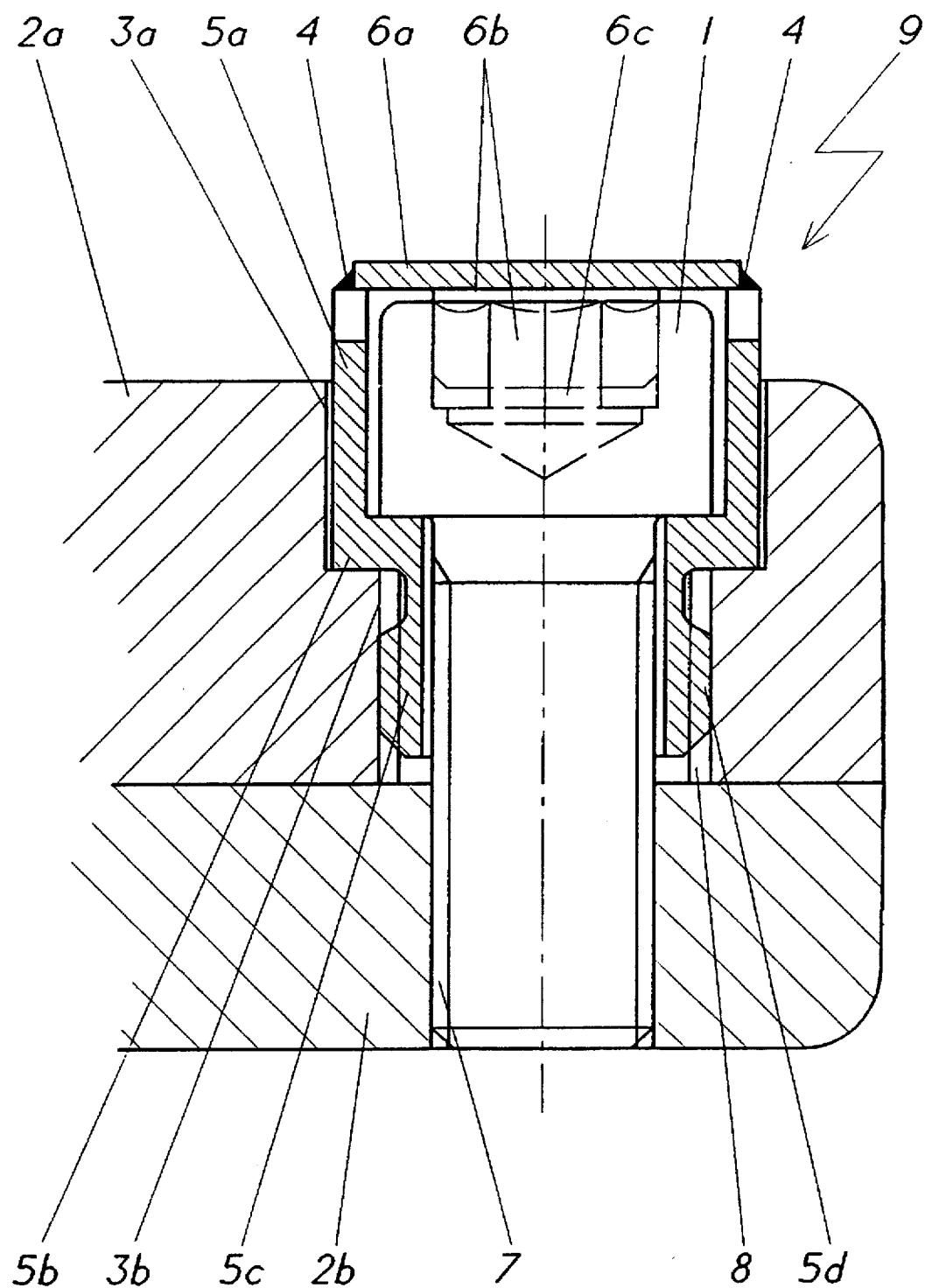
FIG.

SCREW SECURING DEVICE

BACKGROUND OF THE INVENTION

1. Field of the Invention

The invention relates to a screw securing device.

2. Discussion of Background

When a screw has been securely tightened, the thread turns abut on one side. Since screws are self-locking, the friction which occurs on the thread-abutment surface prevents release. If slippage of the screw results in no prestressing of the threads, then the contact pressure in the thread is canceled and the screw can be released. In the event of impacts and vibrations, this limit can be achieved. For this case, use is made, in screw connections, of securing elements which increase the limit-displacement point to such an extent that it is no longer exceeded under practical conditions. The limit-displacement point for screw connections is definable as a point when the flexural resistances of the screw have been exceeded, resulting in slippage.

Anti-loosening securing means prevent any independent release and preserve over 80% of the prestressing force. Depending on the various requirements at the location of use, various anti-loosening securing means are used. These requirements cover both the dynamic and thermal loading as well as the resulting conditions for the material selection of the components which are to be clamped together and of the screw connection.

Thus, self-locking screws and nuts with serrated bearing surfaces, for example, may only be used wherever highly prestressed screw connections are loaded predominantly perpendicularly with respect to the screw axis and the components which are to be clamped together do not have hardened surfaces.

In contrast, microencapsulated adhesive may also be used for hardened surfaces. Here, however, the temperature limit of the adhesive used limits the range of application and care has to be taken to keep the adhesive surfaces free from grease during assembly.

Furthermore, use is made of positively locking, co-clamped washers with lugs or outer protrusions as anti-loosening securing means. Their range of application is limited to screws in the lower strength classes.

Use is also made of non-releasable anti-loosening securing means in the form of welding spots or beads. Here, the heads of the prestressed screws are welded directly to the clamped component. A precondition for using this securing means is the welding capacity of the screw and component materials used. It is usually only alloys which do not have a high strength which can be welded under room conditions. In contrast, it is usually the case that high-strength alloys can be welded only with poor results, while account should also be taken of the high degree of outlay in terms of cost and time for special welding conditions and preheating and cooling operations. This outlay is necessary, in particular, when, on account of the dynamic and thermal operating conditions, both the components which are to be clamped together and the screw connection consist of high-strength, poorly weldable material.

The operation of securing weldable screws on poorly weldable components, should the operating conditions permit the use of such screws, is more simple in comparison. In this case, a weldable washer locking positively on the component is also clamped and then welded to the screw head.

SUMMARY OF THE INVENTION

Accordingly, one object of the present invention is to provide a novel screw securing means of the type referred to above, by means of which, simply and cost-effectively, poorly weldable or non-weldable screws and basic materials can be secured in a non-releasable manner.

This object is achieved according to the invention by the features of the claim.

The advantages of the invention can be seen, inter alia, in the fact that the screw securing means can be removed, in which case neither the screw connection nor the clamped components are damaged. This advantage is of particular significance when using a high-strength, and thus comparatively expensive, alloy.

BRIEF DESCRIPTION OF THE DRAWING

A more complete appreciation of the invention and many of the attendant advantages thereof will be readily obtained as the same becomes better understood by reference to the following detailed description when considered in connection with the accompanying drawing, wherein:

The single figure shows a longitudinal section through a screw connection with a non-releasable screw securing device.

Only those elements which are essential for understanding the invention are shown.

DESCRIPTION OF THE PREFERRED EMBODIMENT

In the single figure of the drawing, 1 designates a screw which has a hexagonal socket 6c, clamps a first component 2a together with a second component 2b, and is secured in a non-releasable manner by means of a screw securing device 9.

The first component 2a has a first bore 3a and a second bore 3b which is arranged coaxially with the first bore 3a. The second bore 3b has a smaller diameter than the first bore 3a and is provided with a left-handed thread 8. Screwed in this left-handed thread 8 of the second bore 3b is a tubular extension 5c, which is connected to a base 5b of a bushing 5a, 5b, said base 5b containing a bore. The bore in the base 5b is of the same size as the internal diameter of the tubular extension 5c, and the external diameter of the tubular extension 5c is smaller than that of the base 5b. In addition to the base 5b, the bushing 5a, 5b also comprises a cylinder 5a, which is supported in the first bore 3a of the first component 2a by means of the base 5b. By way of the bushing 5a, 5b and the tubular extension 5c, the screw 1 is screwed firmly in the component 2b by means of its right-handed thread 7. An insert 6b, which is connected to a cap 6a which closes off the bushing 5a, 5b, is inserted in the hexagonal socket 6c of the screw 1 in a positively locking manner. Said cap 6a is fastened on the bushing 5a, 5b in a non-releasable manner by means of a welding bead 4.

The resulting screw securing device 9 constitutes a combination of the frictionally locking, positively locking and non-releasable securing methods. The two threads, the right-handed thread 7 of the screw 1 and the left-handed thread 5d of the tubular extension 5c, constitute frictionally locking connections to the components 2a and 2b. The insert 6b, along with the cap 6a, is featured in the hexagonal socket 6c of the screw 1 in a positively locking manner and is welded to the cylinder 5a in a non-releasable manner. By using this cap 6a with the insert 6b, the right-handed thread 7 and the left-handed thread 8 are fixed in a mutually locking manner.

This type of screw securing device 9 is used wherever the relevant operating conditions necessitate a specific material selection for the components 2a, 2b which are to be clamped together and for the screw 1. Thus, for example, high temperatures and mechanical vibrations with torsional and shear loading for a screw connection, along with simultaneous fluctuations in the ambient conditions, necessitate the use of high-strength metal alloys both for the components 2a, 2b which are to be clamped together and for the screw 1. It is usually the case that such high-strength metal alloys can only be welded under atmospheric conditions with a high degree of outlay which involves comparatively high costs. For the screw securing device 9 according to the invention, use is made of metal alloys which can be welded in a simple, and thus inexpensive, manner under room conditions.

Therefore, the abovedescribed combination of various metal alloys makes it possible to combine the required high strength of the components 2a, 2b and of the screw 1 with the valued qualities of a non-releasable screw securing device 9, while simultaneously taking cost-effectiveness into account.

A further advantage is that neither of the components 2a, 2b nor the screw is damage d when the screw securing device 9 is opened at the welding bead 4.

Of course, the invention is not restricted to the exemplary embodiment which is shown and described. Therefore, the non-releasable screw securing device 9 may also be used, for example, on all clampable components 2a, 2b and screws 1 which are manufactured from non-weldable materials. A screw head with a hexagonal stub and a corresponding, positively locking mating piece 6b on the cap 6a is likewise conceivable within the scope of the invention.

I claim:

1. A device for securing a screw by means of which a first component and a second component are clamped together, said first component including a first bore and a second bore, said second bore being smaller than said first bore and including first screw threads extending in a first direction, said device comprising:

a bushing including a cylinder and a base, said base containing a central bore, said bushing for being received in said first bore;

a tubular extension including screw threads for being screwed into said first screw threads and which is arranged adjacent said bushing and coaxially with said bore of said base;

a screw including a screw head and screw threads, said screw threads extending in a second direction, said second direction being opposite said first direction, said screw being arranged in said bushing and being screwed through said tubular extension; and a cap welded on said bushing, said cap including an insert which is connected to said screw head in a positively locking manner.

2. A device for securing a screw by means of which a first component and a second component may be clamped together, said first component including a first bore and a second bore, said second bore being smaller than said first bore and including first screw threads extending in a first direction, said device comprising:

a bushing including a cylinder and a base, said base containing a bore, said bushing for being received in said first bore;

a tubular extension including screw threads for being screwed into said first screw threads and which is arranged adjacent said bushing and coaxially with said bore of said base;

a screw including a screw head and screw threads, said screw threads extending in a second direction, said second direction being opposite said first direction, said screw being arranged in said bushing and through said tubular extension; and a cap for being welded on said bushing, said cap including an insert for connection to said screw head in a positively locking manner when said cap is welded to said bushing.

* * * * *